Patented Jan. 25, 1949

2,459,927

UNITED STATES PATENT OFFICE 2,459,927

PROCESS OF MANUFACTURING REGENERATED CELLULOSE SHEET MATERIAL

Camille Dreyfus, New York, N. Y., Bjorn Andersen, Maplewood, N. J., and Nickolas N. Kojevnikoff, New York, N. Y., assignors to Celanese Corporation of America, a corporation of Delaware No Drawing. Application December 20, 1944, Serial No. 569,106

2 Claims. (Cl. 18—57)

This invention relates to the production of transparent films and foils and relates more particularly to the production of transparent, regenerated cellulose films and foils prepared by saponifying films and foils having a basis of an organic acid ester of cellulose.

An object of this invention is the provision of an improved and economical process for the production of strong, stable regenerated cellulose films or foils by operations involving the saponification of films or foils having a basis of cellulose acetate or other organic acid ester of cellulose.

Another object of this invention is the production of clear, transparent films and foils, having a basis of regenerated cellulose which films and foils possess substantially improved strength and elongation characteristics.

Other objects of this invention will appear from the following detailed description. It is to be understood that the term "sheet materials," as used in the claims, is meant to include within its scope materials comprising both films and foils.

Clear, transparent foils having a basis of regenerated cellulose are widely employed in the packaging industry. Their clarity and strength render them ideal for packaging consumer articles since they permit the contents to be clearly observed without opening the package. When a suitable moisture-proofing coating is placed on such foils, they are capable of maintaining the moisture content of the packaged materials within relatively narrow limits for a substantial period of time. Suitably coated foils do not permit the internal moisture to escape nor do they permit excessively high external conditions of humidity to effect undesirable changes in the contents. The regenerated cellulose foil sheet materials most widely employed are prepared by the viscose process. Such regenerated cellulose sheet materials, however, do not possess uniform directional strength and elongation characteristics, i. e. the strength or elongation of a strip taken in a lengthwise direction, i. e. the direction of motion of the casting surface, differs from the strength and elongation of said sheet materials taken in a crosswise direction. The lengthwise breaking strength is far greater than the lateral breaking strength but the elongation is considerably less, and, consequently, these foils cannot be uniformly stressed. These anisotropic properties or limitations in the directional physical characteristics of regenerated cellulose foils prepared by the viscose process limit the commercial application of these materials. Regenerated cellulose foils having a greater uniformity of directional physical properties will greatly augment the field of usefulness of such transparent packaging materials.

We have now discovered that regenerated foils of increased toughness and uniformly oriented or directional strength and elongation characteristics may be prepared by the saponification of foils having a basis of cellulose acetate or other organic acid ester of cellulose by a novel saponification process. In accordance with the novel process of our invention, these improved isotropic regenerated cellulose foils may be produced by treating, prior to saponification, sheets of organic esters of cellulose with an organic swelling agent, either in the liquid or vapor form, for said materials so as to bring the foils to an at least partially swollen condition, saponifying the foils with an alkaline saponifying agent and then incorporating a softening or hygroscopic organic agent in the regenerated cellulose foils which are obtained. The foils resulting from this novel saponification process possess outstanding tensile strength and elongation characteristics which are substantially uniform or isotropic regardless of the direction in which the physical properties are determined. The ultimate breaking point and elongation, as well as the tensile product, which is arrived at by multiplying the ultimate breaking point in a given direction by the elongation in that same direction, as expressed in per cent, is very materially higher than that of regenerated cellulose foils heretofore commercially available.

The cellulose acetate sheets to be saponified may be prepared in accordance with the solvent-casting processes well known in the art or they may be formed directly from either the primary acid solution obtained immediately following acetylation or the secondary or ripened acid solution in which the ripening is effected.

The solvent-casting process, for example, comprises dissolving ripened, precipitated and dried cellulose acetate, without any plasticizer present, in a suitable volatile solvent and casting the solution obtained on to a casting wheel which is rotated at the desired speed. Suitable solvents which may be employed in casting the foils are, for example acetone, solutions of acetone containing 5 to 30% by weight of ethyl alcohol, ethyl methyl ketone, dioxan, mixtures of chlorinated hydrocarbons and alcohols, etc. The concentration of cellulose acetate in the solution will vary depending upon the particular solvent employed and the desired viscosity of the casting solution. Thus, for example, where acetone containing about 20% by weight of ethyl alcohol is employed as the solvent, the cellulose acetate in solution may be present in an amount of from 10 to 30% by weight. The casting wheel may have a peripheral velocity of from 25 to 75 feet per minute and is usually maintained at a temperature of 60 to 100° F. by suitable heating or cooling means to ensure the rapid volatilization of the solvent.

Foils formed directly from the acid dope or solution which is obtained upon esterification, with or without further ripening, may be cast in a similar manner. Preferably, we subject the acid solution to filtration, as by means of a filter press, prior to casting. This initial filtration operation has been found to yield a more satisfactory foil. The casting of the foils is preferably effected with the casting wheel at temperatures of 65 to 80° F. Casting at these lower temperatures produces foils superior in elasticity or lack of brittleness, softness, etc., to those obtained at higher temperatures, as, for example, temperatures of 140 to 150° F. Suitable plasticizers may be added to the acid dope before casting. The acetic acid in the cast foil is allowed to evaporate by drying at 100 to 200° F. for ¼ hour to 3 hours or the partially dried foil may be washed in water for 5 to 30 minutes to remove the remainder of the acetic acid. Subjecting the partially dried foil to the vapors of acetone or of other highly volatile solvent for ¼ hour to 1 hour has also been found to be surprisingly effective in removing the remaining acetic acid, besides imparting improved strength properties to the finished foil.

The dried foils are then subjected to treatment with a swelling agent before being entered into the saponifying bath. Suitable swelling agents are, for example, commercial fusel oil, which comprises a mixture of ethyl, propyl, butyl and amyl alcohol, the amyl alcohol usually being present in an amount of 50 to 75% and the ethyl, propyl and butyl alcohol comprising 50 to 25% by weight, propyl alcohol, or aqueous solutions of acetone or ethyl alcohol of a concentration of from about 10 to 80% by weight of the solvent. The swelling medium is preferably maintained at about room temperature, i. e., from 65 to 80° F. and a satisfactory degree of swelling is effected by maintaining foils in the swelling medium for from 1 to 5 minutes. Optimum results are obtained employing either fusel oil at a room temperature of about 72° F. and maintaining the foil therein for about 3 minutes, or a 25% aqueous acetone solution at about 72° F. with the foil maintained therein for 2 minutes. The pre-swelling can also be accomplished by exposing the sheet for a short time to the vapors of acetone or other volatile solvent. Following the preswelling treatment, the excess swelling agent is wiped off as, for example, by employing suitable squeeze rolls.

The saponification of the swollen films is effected employing any suitable organic or inorganic saponifying agent. Suitable organic saponifying agents are, for example, methylamine, ethylamine, ethanolamine, ethylene diamine, cyclohexylamine, as well as nitrogeneous bases, such as, trimethyl ammonium hydroxide. Inorganic saponifying agents which are satisfactory are, for example, sodium hydroxide or potassium hydroxide, ammonium hydroxide, sodium or potassium silicate, or sodium or potassium carbonate, sodium methylate, etc. Most advantageously, we employ aqueous solutions of sodium hydroxide containing from 1 to 10% by weight of the alkaline saponifying agent. Optimum results are obtained employing a solution comprising sodium hydroxide in an amount of from about 2 to 4% by weight, together with about 8 to 25%, and preferably 12%, of sodium sulfate, preferably anhydrous, with or without 8% by weight of sodium acetate, also preferably anhydrous, the remainder being water. The saponifying bath may be at a temperature of about 65 to 150° F. and the time of treatment from ½ to 15 minutes, depending upon the thickness of the foils and upon the degree of saponification desired. Usually, films or foils suitable for commercial application are of a thickness of from 0.0008 to 0.010 inch. Preferably, the foils are substantially completely saponified so that they contain no more than about 0 to 10% acetyl, calculated as acetic acid. This saponification may be desirably affected without injury to the cellulosic materials contained therein, when employing the above saponifying baths for saponifying foils of about 0.001 to 0.002 inch in thickness, by maintaining the bath at a temperature of about 115° F. and subjecting the foils to the action of the bath for about 3 minutes.

After saponification is completed, the regenerated cellulose foils are washed with either cold or warm water and then treated with a suitable softening agent. The most satisfactory softening agent for conditioning the foils is an aqueous solution of an hygroscopic agent such as glycerine containing from 5 to 25% by weight thereof and a satisfactory degree of absorption with the solution at room temperature, e. g. 72° F., may be obtained by immersing the regenerated cellulose foils therein for from ½ to 3 minutes. This treatment places from 8 to 20% by weight of glycerine in the foil. Excessive glycerine is removed by passing the foils through squeeze rolls such as a wringer and after being dried at 70 to 160° F. for 1 to 30 minutes, the foils may be taken up in the form of suitable rolls and are then ready for use in commercial packaging operations. In place of glycerine, other hygroscopic agents such as ethylene glycol, propylene glycol, etc., may be used.

Effect materials for giving the foils any desired color or any other novel decorative characteristic may be incorporated in the solution from which the foils are cast. Such effect materials may comprise powdered metals, metal oxides, or metal salts, as well as lamp black or other colored pigments or suitable dyes which will not be undesirably effected by the subsequent saponification treatment. The incorporation of such materials is made possible by our method of making a dope and casting saponifiable foils; it cannot be accomplished with regenerated cellulose or viscose foils. On the other hand, our saponified foils can also be dyed directly with water soluble dyes as in the case of regenerated cellulose. Prior to being taken up in roll form, the regenerated cellulose foils prepared in accordance with our novel process may be coated as desired with suitable waxes or pressure-sensitive adhesives so as to render said foils impermeable to moisture, or satisfactory for pressure or heat sealing operations.

In order further to illustrate our invention but without being limited thereto, the following examples are given:

*Example I*

A cellulose acetate foil 0.001 inch in thickness is continuously cast from a solution of acetone-soluble cellulose acetate of 53.4% acetyl value, calculated as acetic acid, in a solvent comprising 80% by weight of acetone and 20% by weight of denatured ethyl alcohol (2B formula). The casting solution comprises 100 parts by weight of the cellulose acetate dissolved in 400 parts by weight of the solvent. The foil is cast at a rate of 3 to 6 feet per minute with the film wheel being maintained at about room temperature of 72° F. The dried foil is stripped from the wheel and entered into a preswelling bath comprising a 25% by weight aqueous solution of acetone. The solution is maintained at room temperature of 72° F. and the foil is held therein for 2 minutes to effect the desired swelling. Excess acetone is wiped off by means of squeeze rolls.

The saponification of the swollen foil is effected employing an aqueous saponifying bath containing 2% by weight of sodium hydroxide, 12% of anhydrous sodium sulfate, 8% of anhydrous sodium acetate, and 78% by weight of water. The bath is held at a temperature of 116° F. and the desired saponification is completed in 3 minutes. The regenerated cellulose foil leaving the saponifying bath has an acetyl value of about 1.0%, calculated as acetic acid. The foil is washed for 3 minutes in running water and then immersed for 1 minute in a 15% aqueous solution of glycerine at a temperature of 72° F. Excess glycerine is removed by passing the foil through a wringer. The conditioned foil is then dried in a suitable drying chamber at 140° F. for one minute, and is taken up directly in the form of a roll. The resulting regenerated cellulose foil obtained has a thickness of 0.0009 inch, and a breaking point of 8.9 kg./mm.$^2$ lengthwise and 8.8 kg./mm.$^2$ crosswise. The elongation lengthwise is 52.2% and 54.8% crosswise. The tensile product, which is the breaking point multiplied by the elongation in per cent is 465 lengthwise and 482 crosswise. A comparable regenerated cellulose foil prepared by the viscose process and of the same thickness, has a breaking point of 8.4 kg./mm.$^2$ as measured on a strip taken in a lengthwise direction but only 4.4 kg./mm.$^2$ taken crosswise. The elongation of this film is only 19.6% lengthwise and 67.7% crosswise. Hence, the tensile product is only 165 lengthwise and 298 crosswise. When the regenerated cellulose foil prepared in accordance with our novel saponification process is tested by a standard tumbling test, comprising tumbling a bean-filled foil bag of standard dimensions in a box approximately 30 x 30 x 17 inches at 17 R. P. M. our improved foil is found to have 280% greater durability, which factor is measured by the total number of revolutions the box makes before failure of the bag due to the repeated impact of the falling bag with the base, than commercially available viscose regenerated cellulose foil.

*Example II*

An unplasticized cellulose acetate foil 0.001 inch in thickness, prepared as in Example I, is preswollen in a solvent bath comprising 75% by weight of fusel oil and 25% by weight of acetone at 72° F. for three minutes. Excess swelling agent is removed and the swollen foil is entered into an aqueous saponifying bath. The bath comprises 2% by weight of sodium hydroxide, 20% by weight of anhydrous sodium sulfate and 78% of water. The bath is at room temperature and the foil is maintained therein for 6 minutes to effect the desired degree of saponification. After saponification, the regenerated cellulose foil is washed in running water for three minutes and then immersed for 1 minute in a 15% by weight aqueous solution of glycerine at 72° C. Excess glycerine is removed by passing the foil through a wringer and the regenerated cellulose foil is then dried for 1 minute at 140° F.

The regenerated cellulose foil obtained, tested at 78° C. and under 50% relative humidity, is found to have a breaking point of 8.8 kg./mm.$^2$ when tested lengthwise and 8.0 kg./mm.$^2$ crosswise. The elongation of the foil is 52.6% lengthwise and 63.8% crosswise, giving the foil a lengthwise tensile product of 462 and a crosswise tensile product of 508. These characteristics, it will be observed, are substantially uniform in all directions and are far superior in comparison to regenerated cellulose foils heretofore available. When bean-filled bags, formed of this regenerated cellulose foil, are subjected to the standard tumbling test, as described, the bags of our novel foil will withstand 210 drops of 30 inches in the rotating box before failure in the foil, while comparable viscose regenerated cellulose bags fail after only 82 drops.

*Example III*

A cellulose acetate foil, 0.001 inch in thickness is cast directly from a ripened solution of cellulose acetate in acetic acid, which solution is obtained directly upon esterification and ripening without precipitation of the cellulose acetate. The solution comprises about 65% of acetic acid, 20% of cellulose acetate, 15% of water, and about 2.5% of an inorganic sulfate resulting from the neutralization of the sulfuric acid employed as the catalyst in the initial esterification reaction. This acid dope, or solution, is cast at a temperature of about 72° F. After evaporation for 5 minutes at 140° F. of the water and acetic acid, the foil is washed for 3 minutes in water and is then subjected to a preswelling operation for 1 to 5 minutes and preferably 2 minutes at 65 to 90° F. and preferably 72° F. in an aqueous acetone solution containing 25% by weight of acetone. Excess acetone solution is removed and the foil is passed into a saponifying bath comprising 1 to 10% and preferably 4% by weight of sodium hydroxide, 12% by weight of anhydrous sodium sulfate, 8% by weight of anhydrous sodium acetate and 76% of water. The desired degree of saponification is effected in 3 minutes with the bath at a temperature of about 116° F. The regenerated cellulose foil obtained is washed for 3 minutes in running water and is then treated for 1 minute at 72° F. in an aqueous solution containing 8.5% by weight of glycerine. After excess glycerine is removed by means of a wringer, the regenerated cellulose foil is dried for 1 minute at 140° F. The foil obtained has a breaking point, taken lengthwise, of 7.4 kg./mm.$^2$ and of 6.4 kg./mm.$^2$ crosswise. The elongation of the foil is 49.6% lengthwise and 71.0% crosswise, giving the foil a tensile product of 368 lengthwise and 458 crosswise. When bean-filled bags formed of this foil are subjected to the standard tumbling test, described above, the bags are found to withstand 274 drops before failure, compared with 82 drops for a regenerated cellulose foil of the same thickness and glycerine content.

While our invention has been more particularly described in connection with the preparation of regenerated cellulose materials, from films and foils having a basis of cellulose acetate, it is to be understood, of course, that our novel saponification process may be employed with equally satisfactory results for the preparation of regenerated cellulose films and foils from sheet materials having a basis of other organic acid esters of cellulose. Examples of other organic esters of cellulose are cellulose propionate and cellulose butyrate as well as mixed esters such as cellulose acetate-propionate and cellulose acetate-butyrate.

It is to be understood that the foregoing detailed description is given merely by way of illustration and that many variations may be made therein without departing from the spirit of our invention.

Having described our invention, what we desire to secure by Letters Patent is:

1. Process for the production of regenerated cellulose sheet material, which comprises subjecting a solvent-cast, substantially dry, non-fibrous sheet material having a basis of cellulose acetate to the action of an aqueous solution of acetone containing about 25% by weight of acetone for about 2 minutes at room temperature to effect a swelling of said sheet material, subjecting the swollen cellulose acetate sheet material to the saponifying action of an aqueous solution containing sodium acetate, sodium sulfate and 1 to 10% of sodium hydroxide by weight, whereby there is obtained a regenerated cellulose sheet of improved and substantially uniform directional strength and elongation characteristics, and then treating the regenerated cellulose sheet material with an aqueous solution of a hygroscopic agent.

2. Process according to claim 1 wherein the solvent employed in solvent-casting the sheet material is acetic acid.

CAMILLE DREYFUS.
BJORN ANDERSEN.
NICKOLAS N. KOJEVNIKOFF.

REFERENCES CITED

The following references are of record in the file of this patent:

UNITED STATES PATENTS

| Number | Name | Date |
| --- | --- | --- |
| 1,920,188 | Dickie et al. | Aug. 1, 1933 |
| 1,961,268 | Voss | June 5, 1934 |
| 1,984,416 | McNally et al. | Dec. 18, 1934 |
| 2,030,983 | Hagedorn et al. | Feb. 18, 1936 |
| 2,058,574 | Dreyfus | Oct. 27, 1936 |